June 9, 1964
H. TAUSCHER
3,136,557
TEMPERATURE RESPONSIVE SEAL
Filed May 7, 1963
3 Sheets-Sheet 1
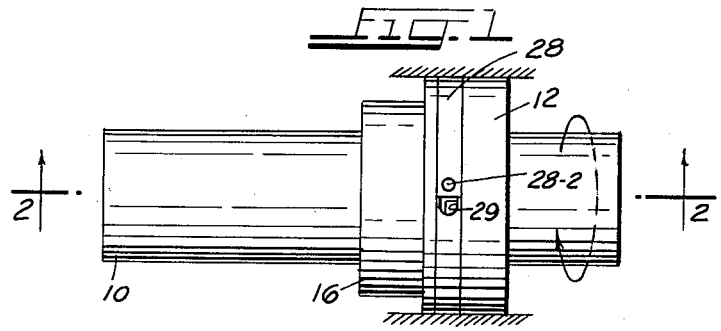
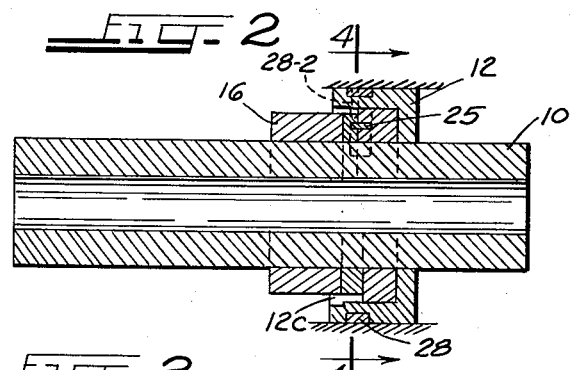
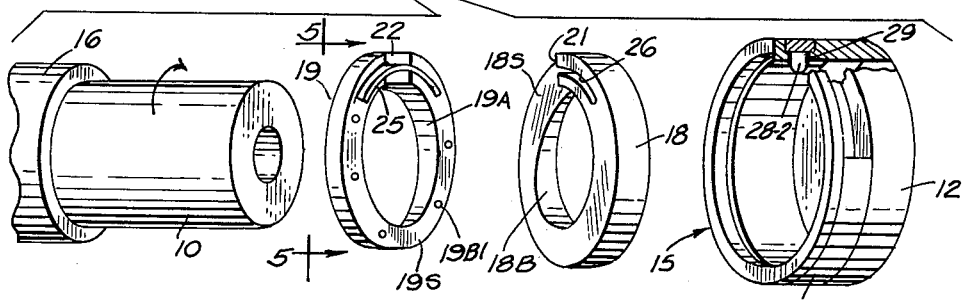
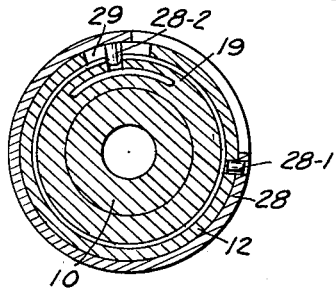 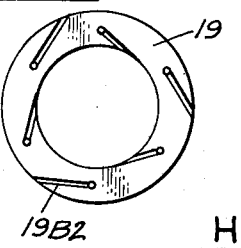
INVENTOR.
HENRY TAUSCHER
BY
Wallace, Kinzer & Dorn
Att'ys.

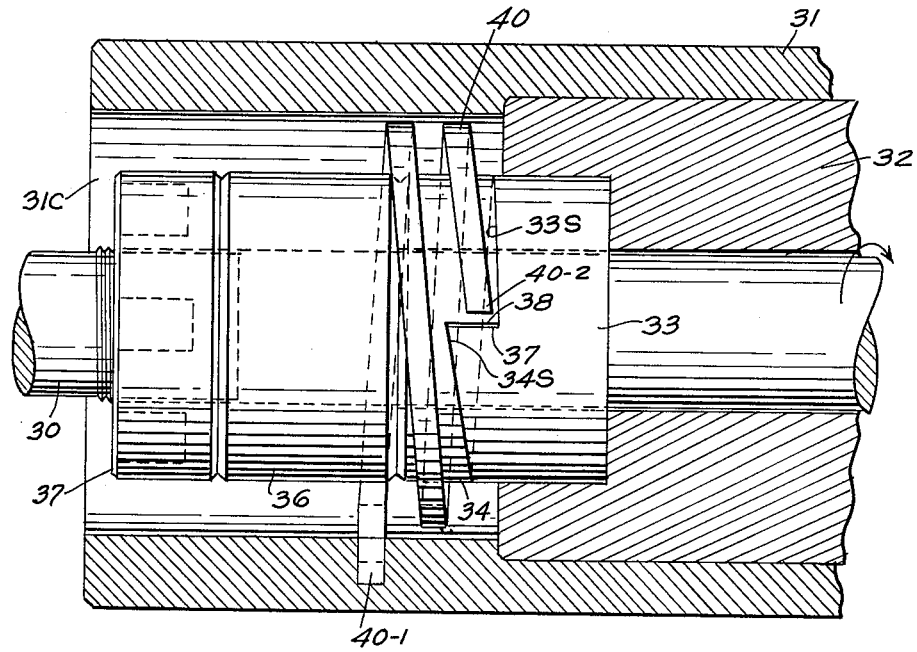

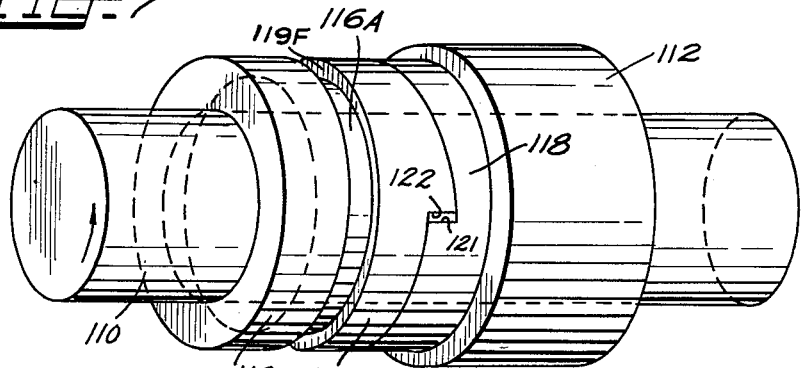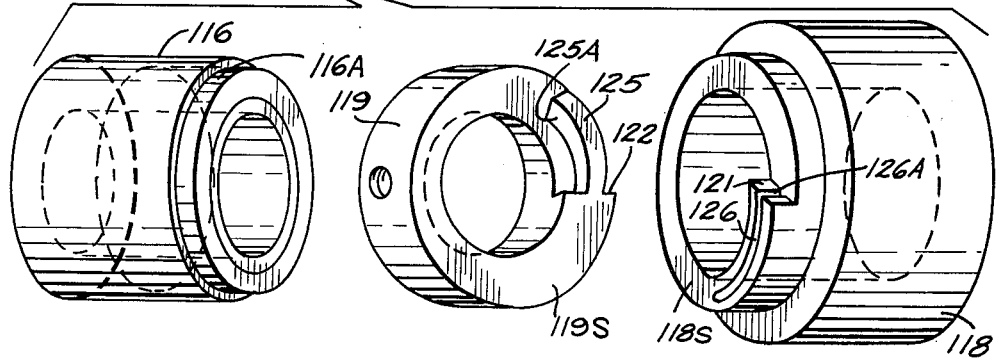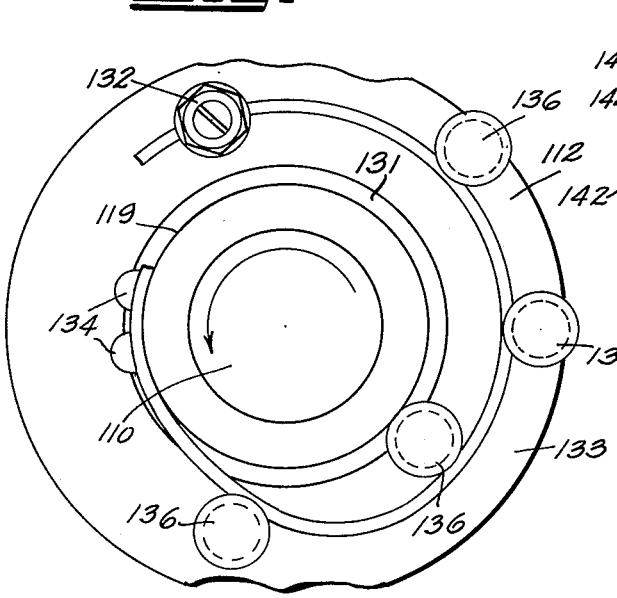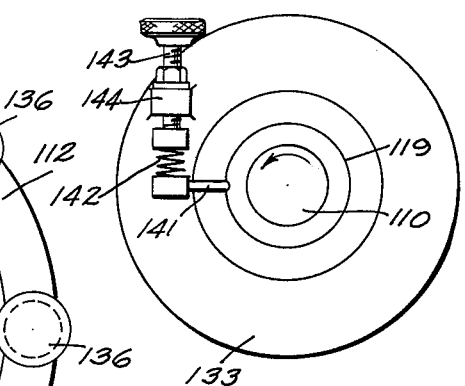

United States Patent Office 3,136,557
Patented June 9, 1964

3,136,557
TEMPERATURE RESPONSIVE SEAL
Henry Tauscher, 809 Fillmore, Oak Park, Ill.
Filed May 7, 1963, Ser. No. 279,683
5 Claims. (Cl. 277—26)

This invention relates to a seal for engines, pumps and the like, and which preferably is of a thermally responsive nature to assure increasing effectiveness upon increasing temperatures. This application is a continuation-in-part of my application Serial No. 149,266, filed November 1, 1961, and now abandoned.

In the course of operation of engines and pumps, increasing temperatures naturally are conducive to more fluidity in lubricating fluids and the like, and hence there is greater tendency with increasing temperature for such fluids to seep into areas where neither needed nor desired. This is particularly so in the combustion areas of internal combustion engines, hydraulic controls for aircraft and the like. It will be appreciated that the prevention of passage of lubricating fluids and the like from one area to another is merely exemplary of numerous conditions where the ingress of undesired foreign matter becomes more likely with increasing temperatures. It is therefore advantageous to be able to increase the efficiency of a seal with rising temperatures for preventing such ingress.

Under and in accordance with the present invention, a temperature responsive seal is made available including two members of which one is immovable and the other is rotatable relative thereto, and these members have adjacent faces configured to afford single turn, complemental helices such that by rotating the second member relative to the first, a tighter and tighter seal fit between the engageable surfaces is assured, and such rotation is induced by a thermally responsive means. This arrangement constitutes the primary object of the present invention. The seal of the present invention characterized aforesaid is particularly useful for establishing an effective seal between a rotatable shaft and a chamber in a surrounding housing, and a specific object of the present invention is to conform the above described seal structure to an environment of this kind. Another object of the present invention is to so construct the seal members as to permit movement of the rotatable member in one direction only, namely, in a seal tightening direction, and to do this by affording a stop between the members that is effective to limit motion of the rotatable member in the opposite direction. Such construction is manifest in the development of an opening of gradually increasing dimension between the stops during the course of effective operation of the seal, and another object of the present invention is to seal this opening.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is an elevational view showing a typical assembly involved under one embodiment of the present invention;

FIG. 2 is a sectional view taken on the line 2—2 of FIG. 1;

FIG. 3 is an exploded view illustrating details of the various parts shown in FIG. 2;

FIG. 4 is a sectional view taken on the line 4—4 of FIG. 2;

FIG. 5 is a plan view of one of the seal members taken on the line 5—5 of FIG. 3; and FIG. 6 is a sectional view illustrating another embodiment of the invention;

FIG. 7 is an assembled perspective view of a further embodiment of the invention;

FIG. 8 is an exploded perspective view, similar to FIG. 3, of the embodiment of FIG. 7;

FIG. 9 is an end view showing a thermostatic control for the embodiment of FIG. 7; and FIG. 10 is an end view of a release device for the seal of FIG. 7.

One embodiment of the present invention is illustrated in FIGS. 1 to 5. Referring to FIGS. 1 and 2, a rotatable shaft 10 is illustrated in association with an outwardly surrounding housing 12 through which the shaft 10 projects. The shaft rotates in the direction indicated by the arrow. This is merely exemplary of a typical environment for the present invention wherein the seal structure 15, FIG. 3, is intended to prevent leakage of fluid from the chamber 12C of the housing radially inwardly to the shaft 10. The shaft 10 is assumed to be fixed against axial displacement, as by thrust bearings or the like. The shaft 10, for example, has a counterpart in the engine disclosed in my co-pending application Serial No. 51,402, filed August 23, 1960.

The housing 12 for the shaft 10 is of course fixed, and as noted above the shaft 10 rotates relative thereto. The shaft 10 has an enlarged collar 16 fixed thereto to rotate therewith, and it will be observed that the collar 16 is located on the side of the housing 12 that is recessed to afford the chamber 12C.

A seal member 18 of annular shape is disposed within the chamber 12C of the housing 12, and the outside diameter of the seal member 18 is such as to have a tight press fit within the inside diameter of the housing 12 so that the seal member is immovably related to the housing. The seal member 18 is provided with a bore 18B which is of slightly larger diameter than the shaft 10 so that the latter can be passed therethrough and rotates freely therein.

A second annular seal member 19 is included in the seal, and this seal member is provided with a bore 19A of such size as to enable the shaft 10 to pass therethrough and rotate freely therein. The seal member 19, unlike the seal member 18, is rotatable relative to the shaft 10 and relative to the housing 12, and consequently has an outer diameter free of any fixed member such as the housing 12. It may be noted, however, that neither seal member 18 nor seal member 19 rotates with the shaft 10.

The seal members 18 and 19 are axially juxtaposed on the shaft 10 as will be noted in FIG. 2, and normally the parts, as illustrated in FIG. 2, are held in a relatively compact nested relationship by the collar 16, which also serves as a back-up member against which the seal member 19 will react when performing its intended function as hereinafter explained.

The adjacent faces of the seal members 18 and 19 are formed with mating single-turn spiral or helical surfaces 18S and 19S, FIG. 3, and each such spiral surface terminates at a stop shoulder, 21 and 22 respectively. These surfaces are complementally related, with the one stop 21 abutting the other stop 22.

Inasmuch as it is intended that there be a displacement between the shoulders 21 and 22 when the seal is actuated in the manner described hereinafter, it is important to provide a supplementary seal active between the shoulders 21 and 22. Under the present invention, the supplemental seal is in the form of an arcuate leaf or blade projecting from the shoulder of one of the seal members.

Thus, the seal member 19 is provided with an arcuate leaf seal 25, FIG. 2, and this leaf seal is adapted to fit in a correspondingly configured slot 26 in the opposing seal member 18. With this construction, even though an opening should be disclosed between the shoulders of the seal members, there will be no communication to the shaft 10 because of the interposed seal 25.

The present invention preferably includes means to adjust the engagement between the spiral surfaces 18S and 19S with changes in the ambient temperatures surrounding the housing 12. This is accomplished by exerting a moment on the relatively movable one of the seal members, member 19, in a direction that causes the shoulder 22 thereof to become displaced relative to the shoulder 21 of the fixed seal member 18. In other words, the rotatable seal member 19 is turned in a direction which produces an expansion or contraction of the wedge action between the engaged surfaces 18S and 19S of the seal members. Reaction occurs against the collar 16, with expansion of the seal members, and consequently the spiral surfaces are pressed into tighter and tighter sealing relationship, one with another, upon increasing temperature. If unrelieved, the result is a binding action on collar 16, braking the shaft. It will be appreciated that the movements involved in the thermal correction required are slight, but highly important in maintaining an efficient seal without undue braking.

The means for inducing rotary movement of the movable seal member is in the form of a thermally responsive member that expands with increasing temperatures in such a manner that the expansion thereof is transmitted to the rotary seal member 19 to produce a corresponding rotation of the seal member in the desired direction. The thermally responsive member is in the form of a curved strip of metal 28 having the desired coefficient of thermal expansion. As a matter of fact, the strip 28 is curved substantially to comply with the outside diameter of the seal assembly 18—19, being seated in an external groove in the housing 12.

The expandable band or strip 28 is secured at one end to the housing 12 by a pin or the like 28–1, FIG. 2, constituting the anchor point of the band 28 relative to which the increasing dimension is measured. The opposite end of the thermally responsive element 28 is connected to the seal member 19. To this end, the strip 28 is provided at its free end with a pin 28–2 movable in a slot 29, FIG. 3, in the housing 12, and the free end of the pin 28–2 is disposed in a recess in the seal member 19.

The parts are so dimensioned that under normal operating conditions the seal 18—19 is, in effect, unwound, and when shaft 10 is rotating in the indicated direction the collar 16 tends to carry the seal member 19 along. This however characterizes the effective movement of the seal, and it may be mentioned in this connection that provision is made for furnishing copious amounts of lubricant between the adjacent faces of the seal member 19 and the collar 16. Thus, as shown in FIGS. 3 and 5, the seal member 19 is provided on opposite faces with numerous lubricating openings as 19B$^1$ and channels 19B$^2$.

Upon a substantial increase in temperature that might ordinarily cause other seal members to expand to a state where they bind unduly, or where oil or the like becomes so thin as to become difficult to confine by an ordinary seal, the seal of the present invention is energized by the expanding band 28 to relieve binding while still maintaining an effective seal between the engaged surfaces thereof.

Another embodiment of the present invention is illustrated in FIG. 6, in association with a rotatable shaft 30 disposed within a chamber 31C of an external housing 31. The housing 31 is provided with an end wall member 32 recessed at one face thereof and dimensioned to receive and secure by a press fit one seal member 33 of a seal assembly. The seal assembly also includes a second floating seal member 34. Both seal members are of annular form and each is provided with a bore dimensioned to enable the shaft 30 to freely rotate therein. Again, however, neither seal member 33 nor 34 is rotatable with the shaft.

A stop or reaction member in the form of a collar 36 is press fit or otherwise fixed on to the shaft 30, and advantageously a retainer in the form of a nut 37 is run up on a corresponding threaded portion of the shaft 30 to retain the stop 36 accurately in place.

As in the foregoing embodiment, the seal members 33 and 34 are axially juxtaposed adjacent one another on the shaft 30, and the adjacent faces thereof are provided with respective single-turn spiral surfaces 33S and 34S. The spiral surfaces terminate at respective flat shoulders 37 and 38. The shoulder 38, when engaged with the shoulder 37, limits the extent of possible rotative movement of the rotatable seal member 34 in the direction opposite that desired for effective sealing action as hereinafter explained.

Effective sealing action without binding, at increasing temperatures, is maintained by a slight movement of the shoulder 38 toward the shoulder 37, and this of course characterizes turning movement of the sealing member 34 in a corresponding direction relative to the seal member 33, which is immovable. Such is induced by thermally responsive means, preferably in the form of a spiral band 40 of metal having the desired coefficient of thermal expansion.

In order that the band 40 will be effective in the desired manner, one end 40–1 thereof is anchored to the housing 31, and the portions outward thereof are spiraled about the seal assembly with the opposite end 40–2 of the spiral band secured to the rotary one of the seal members 34, adjacent the shoulder 38.

The direction of rotation of the shaft 30 is indicated by the arrow in FIG. 6, and inasmuch as the stop 36 is rotating therewith, there is some tendency for the latter to induce rotation of the seal member 34. Generous amounts of lubricant are therefore contemplated as above described.

With a given positive temperature differential, a significant expansion of the seal actuator 40 occurs, pulling the shoulder 38 toward the shoulder 37 with a substantial force. Cooling produces the opposite effect so that, as the shoulders are separated, the spiral surfaces engage more tightly, increasing the effectiveness of the seal. Inasmuch as the shoulders 37 and 38 will disclose an opening as the seal becomes effective, an auxiliary seal 25 of the kind described above is utilized.

FIGS. 7 and 8 illustrate another embodiment of the invention which in many respects is similar to the seal construction illustrated in FIGS. 1–3. The seal assembly illustrated in FIGS. 7 and 8 comprises a rotatable shaft 110 having a fixed collar 116 mounted thereon. Collar 116 may be press fit to the shaft 110 and, if desired, auxiliary means such as a set screw or the like may be utilized to assure maintenance of a fixed axial position for the collar on the shaft. The collar 116 is provided with an annular carbon insert 116A that faces the remaining members of the seal assembly.

Immediately adjacent the collar 116, the next member in the seal assembly is a seal member 119. The seal member 119 is of annular configuration and is provided with a central axial bore through which the shaft 110 passes, the seal member being freely rotatable on the shaft. The left-hand face 119F of the seal member 119 engages the external face of the carbon insert 116A of the collar 116. The opposite surface of seal member 119 is a helical surface 119S, essentially similar in configuration to the corresponding surface 19S of the embodiment of FIGS. 1–3.

The next member in the seal assembly is a second seal member 118 which corresponds generally to the member 18 of the first-described embodiment. Thus, the seal member 118 is provided with a helical surface 118S that is complemental to and that is engaged by the surface 119S on the floating seal member 119. In this instance, the seal member 118 is not mounted in a separate housing member, such as the housing member 12; rather, the seal member 118 is provided with an axially extending portion 112 of enlarged diameter that is fitted into the housing wall through which the shaft 110 extends. As before, the member 118 is held in fixed position in the housing and does not rotate in the use of the seal.

The principal difference between the embodiment of FIGS. 7 and 8 and that of FIGS. 1–3 is in the configuration of the auxiliary and supplemental seal that bridges the gap that may open up between the shoulders 121 and 122 of the helical seal surfaces 118S and 119S, respectively. As best shown in FIG. 8, the seal member 119 is provided with an arcuate auxiliary seal element 125 that projects from the shoulder 122, along the surface 119S. This auxiliary seal element is of tapered configuration, having inclined side walls 125A. The auxiliary or supplemental seal element 125 is received in an arcuate recess 126 in the spiral or helical surface 118S of the seal member 118, extending inwardly from the shoulder 121. The side walls 126A of the recess 126 are inclined in a manner complemental to the inclination of the side walls 125A of the supplemental seal member 125, this construction affording a substantial improvement in the effectiveness of the seal as compared with a construction using parallel walls for the auxiliary seal element.

FIG. 9 illustrates a thermal adjustment arrangement that may be used for the seal assembly shown in FIGS. 7 and 8. As illustrated in FIG. 9, a metal strip 131 having a given thermal coefficient of expansion is affixed at one end 132 to the wall or housing 133 through which the shaft 110 extends. The metal strip 131 extends in a spiral curve from the anchor point 132 around to a point 134 at which it is connected to the floating seal member 119. With increasing temperature, the expansion of the strip 131 tends to rotate the floating seal member 119 in a clockwise direction, as seen in FIG. 9, adjusting the rotational position of the floating seal member to compensate for expansion of the seal elements caused by the temperature increase. A series of retainer member 136 may be utilized to confine the metal strip 131 to the desired spiral configuration, affording a controlled thermostatic adjustment for the seal.

It is also possible to provide for manual adjustment of the seal, by rotation of the floating seal member 119, and an arrangement of this kind is illustrated in FIG. 10. As shown in FIG. 10, a pin or similar actuator member 141 may be mechanically connected to the seal member 119, the pin 141 being engaged by a spring 142. Compression of the spring 142, on the other hand, is controlled by an adjustable stop member 143 threaded into a suitable collar 144 on the wall or housing member 133.

By advancing or retracting the adjustable stop member 143, the angular position of the pin 141 may be adjusted to set the seal by adjusting the angular orientation of the two seal members relative to each other. During subsequent operation of the seal, if the seal becomes too tight and tends to point, the resilient connection afforded by the spring 142, to the pin 141, enables the seal to shift slightly, and thereby prevent the seal from jamming the shaft. Of course, a manual adjustment such as shown in FIG. 10 can be used in conjunction with a thermal adjustment apparatus such as shown in FIG. 9; they are not inclusive with respect to each other.

From the foregoing, it will be seen that the present invention affords an improved seal for a rotary shaft, characterized by a stationary member and a rotatable member that are engaged along spiral surfaces, with a supplemental seal to fill any gap that opens up between the surfaces due to relative rotation of the seal members. The seal is easily compensated for thermal changes, by rotation of the one seal member relative to the other. Moreover, the initial operating condition of the seal can be easily adjusted in the same manner.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:
1. A seal for a rotary shaft passing through a housing wall, said seal comprising: a first seal member, mounted in fixed position within the housing wall, having an axial bore receiving said shaft in freely rotatable relation and having a single-turn helical end surface terminating in a shoulder;

a second seal member, having an axial bore receiving said shaft in freely rotatable relation, and having a single-turn helical end surface, complemental to and engaged in mating sealing engagement with said helical end surface of said first seal member and having a shoulder facing the shoulder on said first seal member;

means maintaining said seal members in substantially fixed axial position, relative to said shaft, to hold said sealing surfaces in engagement with each other;

means for rotating said second seal member through a limited angle, relative to said first seal member, to vary the tightness of engagement between said seal surfaces;

and a supplemental seal member, comprising an arcuate continuation of the helical end surface of one of said seal members extending beyond the shoulder of said one seal member and into a corresponding arcuate recess in the end surface of the other seal member, for completing the seal when said shoulders are angularly displaced from each other.

2. A seal for a rotary shaft passing through a housing wall, said seal comprising: a first seal member, mounted in fixed position within the housing wall, having an axial bore receiving said shaft in freely rotatable relation and having a single-turn helical end surface terminating in a shoulder;

a second seal member, having an axial bore receiving said shaft in freely rotatable relation, and having a single-turn helical end surface, complemental to and engaged in mating sealing engagement with said helical end surface of said first seal member and having a shoulder facing the shoulder on said first seal member;

means maintaining said seal members in substantially fixed axial position, relative to said shaft, to hold said sealing surfaces in engagement with each other;

thermally responsive control means for rotating said second seal member through a limited angle, relative to said first seal member, to vary the tightness of engagement between said seal surfaces and compensate for thermal expansion and contraction of the seal members;

and a supplemental seal member, comprising an arcuate continuation of the helical end surface of one of said seal members extending beyond the shoulder of said one seal member and into a corresponding arcuate recess in the end surface of the other seal member, said supplemental seal member and said recess having complementally converging and diverging side walls, for retaining an effective seal around the complete periphery of said shaft whenever said shoulders are angularly displaced from each other.

3. A seal for a rotary shaft passing through a housing wall, said seal comprising: a first seal member, mounted in fixed position within the housing wall, having an axial bore receiving said shaft in freely rotatable relation and having a single-turn helical end surface terminating in a shoulder;

a second seal member, having an axial bore receiving said shaft in freely rotatable relation, and having a single-turn helical end surface, complemental to and engaged in mating sealing engagement with said helical end surface of said first seal member and having a shoulder facing the shoulder on said first seal member;

means maintaining said seal members in substantially fixed axial position, relative to said shaft, to hold said sealing surfaces in engagement with each other;

control means for rotating said second seal member through a limited angle, relative to said first seal member, to vary the tightness of engagement between said seal surfaces, said control means including an arcuate metal element anchored at one end to the housing and at the other end to the second seal member, for adjusting the seal to compensate for thermal expansion and contraction;

and a supplemental seal member, comprising an arcuate continuation of the helical end surface of one of said seal members extending beyond the shoulder of said one seal member and into a corresponding arcuate recess in the end surface of the other seal member, for completing the seal when said shoulders are angularly displaced from each other.

4. A seal for a rotary shaft passing through a housing wall, said seal comprising: a first seal member, mounted in fixed position within the housing wall, having an axial bore receiving said shaft in freely rotatable relation and having a single-turn helical end surface terminating in a shoulder;

a second seal member, having an axial bore receiving said shaft in freely rotatable relation, and having a single-turn helical end surface, complemental to and engaged in mating sealing engagement with said helical end surface of said first seal member and having a shoulder facing the shoulder on said first seal member;

means maintaining said seal members in substantially fixed axial position, relative to said shaft, to hold said sealing surfaces in engagement with each other;

adjustable control means for rotating said second seal member through a limited angle, relative to said first seal member, to vary the tightness of engagement between said seal surfaces, said control means including a resilient retainer normally holding the second seal member in a given angular orientation but permitting limited angular movement thereof;

and a supplemental seal member, comprising an arcuate continuation of the helical end surface of one of said seal members extending beyond the shoulder of said one seal member and into a corresponding arcuate recess in the end surface of the other seal member, for completing the seal when said shoulders are angularly displaced from each other.

5. A seal for a rotary shaft passing through a housing wall, said seal comprising: a first seal member, mounted in fixed position within the housing wall, having an axial bore receiving said shaft in freely rotatable relation and having a single-turn helical end surface terminating in a shoulder;

a second seal member, having an axial bore receiving said shaft in freely rotatable relation, and having a single-turn helical end surface, complemental to and engaged in mating sealing engagement with said helical end surface of said first seal member and having a shoulder facing the shoulder on said first seal member, said second seal member having a planar annular end surface on the end thereof opposite said helical surface;

a collar, mounted in fixed position on said shaft and having an annular carbon seal engaging said planar end surface of said second seal member, for maintaining said seal members in substantially fixed axial relationship on said shaft;

thermally responsive control means for rotating said second seal member through a limited angle, relative to said first seal member, to vary the tightness of engagement between said seal surfaces and compensate for thermal expansion and contraction of the seal members;

and a supplemental seal member, comprising an arcuate continuation of the helical end surface of one of said seal members extending beyond the shoulder of said one seal member and into a corresponding arcuate recess in the end surface of the other seal member, said supplemental seal member and said recess having complementally converging and diverging side walls, for retaining an effective seal around the complete periphery of said shaft whenever said shoulders are angularly displaced from each other.

References Cited in the file of this patent
UNITED STATES PATENTS

| | | |
|---|---|---|
| 1,211,613 | Moore | Jan. 9, 1917 |
| 2,044,499 | D'Agostino | June 16, 1936 |
| 2,349,024 | Waddell | May 16, 1944 |
| 2,986,250 | Becker | May 30, 1961 |
| 3,082,011 | Kroekel | Mar. 16, 1963 |